US012794034B2

(12) United States Patent
Bäder et al.

(10) Patent No.: US 12,794,034 B2
(45) Date of Patent: Nov. 10, 2026

(54) MOTOR VEHICLE WITH AN ENERGY STORAGE FLOODING DEVICE AND METHOD FOR OPERATING A MOTOR VEHICLE

(71) Applicant: AUDI AG, Ingolstadt (DE)

(72) Inventors: Dirk Bäder, Fellbach (DE); Michael Grabowski, Ingolstadt (DE); Christian Rebinger, Munich (DE); Dirk Schroeder, Manching (DE)

(73) Assignee: AUDI AG, Ingolstadt (DE)

( * ) Notice: Subject to any disclaimer, the term of this patent is extended or adjusted under 35 U.S.C. 154(b) by 634 days.

(21) Appl. No.: 18/317,315

(22) Filed: May 15, 2023

(65) Prior Publication Data

US 2023/0382271 A1 Nov. 30, 2023

(30) Foreign Application Priority Data

May 30, 2022 (DE) ......................... 102022113604.3

(51) Int. Cl.

| | |
|---|---|
| ***H01M 10/625*** | (2014.01) |
| ***A62C 3/07*** | (2006.01) |
| ***B60K 11/02*** | (2006.01) |
| ***B60L 58/26*** | (2019.01) |
| ***H01M 10/613*** | (2014.01) |

(52) U.S. Cl.

CPC ............. *H01M 10/625* (2015.04); *A62C 3/07* (2013.01); *B60K 11/02* (2013.01); *B60L 58/26* (2019.02); *H01M 10/613* (2015.04)

(58) Field of Classification Search

CPC ..... H01M 10/61; H01M 10/625; B60L 58/26; B60L 50/60; B60L 53/31; B60L 53/302; B60L 58/24; B60K 11/02; B60K 1/00; A62C 3/16; A62C 3/07; A62C 3/06; Y02T 10/7072; Y02T 10/70

See application file for complete search history.

(56) References Cited

FOREIGN PATENT DOCUMENTS

| | | | | | |
|---|---|---|---|---|---|
| CN | 107054120 | A | | 8/2017 | |
| DE | 102008059968 | A1 | | 6/2010 | |
| DE | 112012003099 | T5 | * | 7/2014 | .............. B60L 50/66 |
| DE | 102019131386 | A1 | | 5/2020 | |
| DE | 202021106068 | U1 | | 11/2021 | |
| DE | 102020117581 | A1 | | 1/2022 | |

(Continued)

OTHER PUBLICATIONS

Machine Translation DE 102020117581 (Year: 2020).*

(Continued)

*Primary Examiner* — Michael A Band

(74) *Attorney, Agent, or Firm* — Maier & Maier, PLLC

(57) ABSTRACT

A motor vehicle with an energy storage, a coolant connection device for coupling to an external coolant source, and a cooling device. At least in one first operating condition a coolant can be supplied, via the coolant connection device, to the motor vehicle for thermally regulating the energy storage by the cooling device during a charging process for electrically charging the energy storage, and at least in a second operating condition an interior of the energy storage can be flooded. The motor vehicle has a first cooling circuit part and a second cooling circuit part which is fluidically separated from the first and is coupled via a heat exchanger at least in the first operating condition.

6 Claims, 3 Drawing Sheets

(56) References Cited

FOREIGN PATENT DOCUMENTS

| | | | |
|---|---|---|---|
| DE | 102020211786 | A1 | 3/2022 |
| DE | 102020131110 | A1 | 5/2022 |

OTHER PUBLICATIONS

Machine Translation DE 102020211786 (Year: 2020).*
Machine Translation DE 112012003099 (Year: 2014).*
Search Report issued on May 22, 2023, in corresponding German Application No. 102022113604.3, 24 pages.
Office Action issued on Apr. 8, 2026, in corresponding Chinese Application No. 202310612350.2, 17 pages.

* cited by examiner

MOTOR VEHICLE WITH AN ENERGY STORAGE FLOODING DEVICE AND METHOD FOR OPERATING A MOTOR VEHICLE

FIELD

The invention relates to a motor vehicle with an energy storage flooding device and with an energy storage that can be charged using an external electrical energy source, with a charging connection device for electrically connecting the energy storage to the external electrical energy source, with a coolant connection device for coupling to an external coolant source and with a cooling device, which is thermally coupled to the energy storage. The motor vehicle is arranged in such a way that, at least in a specific first operating condition, a coolant can be supplied to the motor vehicle via the coolant connection device to control the temperature of the energy storage by means of the cooling device during a charging process for electrically charging the energy storage, wherein the energy storage flooding device is designed to flood an interior of the energy storage of the energy storage in at least one specific second operating condition different from the first operating condition. The invention relates to a method for operating a motor vehicle.

BACKGROUND

DE 20 2021 106 068 U1 describes a fire protection device for an electric vehicle with a battery, which has a battery cell arranged in a receiving space and a duct, wherein a duct wall separates the duct and the receiving space from one another, and the fire protection device has a fluid supply device that supplies the duct with pressurized fluid, and a control device that allows or prevents the supply of electrical energy from a charging device to the battery depending on a pressure or a pressure change of the fluid in the duct. The fire protection device can be part of a charging station. The duct wall can have failure regions that fail at a correspondingly high temperature. This allows the cooling fluid to get into the battery. At low temperature, the cooling fluid can be stationary in the duct or it can flow therethrough.

If a cooling fluid provided externally flows through the cooling ducts inside the motor vehicle, this entails a number of disadvantages. If, for example, the cooling fluid is pure water, it should be possible to completely remove it from the internal vehicle ducts after the charging process, since otherwise this cooling fluid can freeze and damage the corresponding vehicle components, especially in winter. If, on the other hand, water with antifreeze or another cooling fluid with antifreeze is supplied as the cooling fluid, for example from a charging station, there is no risk of freezing, but this severely limits the possible applications, since no conventional water connection for cooling at charging stations can be used anymore. It would also be conceivable to remove, in particular completely, the cooling fluid supplied to the motor vehicle, after the charging process has ended, which is time-consuming. This is particularly complicated and expensive when the duct in which this fluid is located is very long.

SUMMARY

It is therefore the object of the present invention to provide a motor vehicle and a method which provides increased safety in connection with energy storage devices in motor vehicles in the simplest and most efficient manner possible.

The invention relates to a motor vehicle with an energy storage flooding device and with an energy storage that can be charged using an external electrical energy source, with a charging connection device for electrically connecting the energy storage to the external electrical energy source, with a coolant connection device for coupling to an external coolant source and with a cooling device, which is thermally coupled to the energy storage. The motor vehicle is arranged in such a way that, at least in a specific first operating condition, a coolant can be supplied to the motor vehicle via the coolant connection device to control the temperature of the energy storage by means of the cooling device during a charging process for electrically charging the energy storage, wherein the energy storage flooding device is designed to flood an interior of the energy storage in at least one specific second operating condition different from the first operating condition. The motor vehicle has a first cooling circuit part and a second cooling circuit part, which is fluidically separated from the first cooling circuit part at least in the first operating condition. Furthermore, the motor vehicle includes a heat exchanger which is provided to thermally couple the first cooling circuit part and the second cooling circuit part. Furthermore, the cooling device is part of the second cooling circuit part, wherein the energy storage can be flooded in the second operating condition by means of the coolant supplied via the coolant connection device.

This has several advantages: On the one hand, a vehicle-internal coolant, for example a water-glycol mixture, can be used to cool the energy storage, in particular both during the charging process and in other normal operating conditions that differ from the second operating condition. This vehicle-internal coolant only flows in the second part of the cooling circuit. The energy storage flooding device can thus advantageously be implemented using cooling structures that already exist in the motor vehicle. As a result, the energy storage flooding device is designed to be significantly less expensive and simpler. In addition, an enormous amount of installation space can be saved as a result. At the same time, the separation of the first and second cooling circuit parts can ensure that, at least in the normal operating conditions, in particular in the first operating condition during the charging process, the externally provided coolant does not mix with the coolant inside the vehicle. Due to the fact that the first and second cooling circuit parts are fluidically separated at least in the first operating condition by the heat exchanger, which can also be referred to as heat transfer device, the coolant supplied to the motor vehicle via the coolant connection device can be supplied to the first cooling circuit part and the supplied coolant in the first operating condition can be discharged from the vehicle through the heat exchanger by means of the coolant connection device without partially or completely passing through the second coolant part. In addition, this makes it significantly easier to completely discharge the externally supplied coolant from the motor vehicle, since the heat exchanger can be arranged very close to the coolant connection device, for example. The fluid path from the coolant connection device to the heat exchanger and back to the coolant connection device can thus be made extremely short. Even if some of the externally supplied coolant remains in the motor vehicle, it is an extremely small amount that cannot cause any damage even if it freezes. In principle, any coolant can be used as an externally supplied coolant, and in the simplest case water can be used, which can be provided in a particularly simple and cost-effective manner, for example via a conventional water connection, such as a city water connection, a connection via a garden hose or even a connection provided by the same external power source. This in turn increases the availability of external coolant sources and thus increases safety in connection with high-voltage energy storages for motor vehicles. At the same time, the externally provided coolant can be used both in the first operating condition for assisted cooling of the energy storage, in that heat from the second cooling circuit part is absorbed and dissipated by this coolant via the heat exchanger. On the other hand, in an emergency condition, that is to say in the second operating condition, the externally supplied coolant can advantageously also flood the energy storage. In the event of a fire or of a thermal runaway process of a battery cell of the energy storage, thermal propagation can be prevented or at least delayed, or if a fire has already broken out, this can be counteracted particularly efficiently or it can even be extinguished. In this way, safe use of energy storages in motor vehicles can be significantly improved in a particularly simple, cost-effective and space-efficient manner.

The motor vehicle is designed, for example, as an electric vehicle. This can also be understood to mean a hybrid vehicle or a purely battery-powered motor vehicle. The energy storage is preferably designed as a battery, in particular a traction battery, of the motor vehicle. In particular, the energy storage can be designed as a high-voltage battery. The energy storage can, for example, comprise a battery housing and battery cells accommodated therein. These battery cells can be formed, for example, as lithium-ion cells. The battery cells can optionally also be combined into battery modules. The charging connection device can be designed, for example, as a conventional charging socket for coupling to a charging plug. The external source of electrical energy can be provided, for example, by a charging column or charging station or by a wall box or a domestic power connection. Especially when the external electrical energy source is designed as a charging column or charging station, it is often the case that such a charging column also has its own cooling system provided during the charging process. In other words, such a charging column can also have a coolant source external to the motor vehicle or at least a connection to such a coolant source. The preferred coolant is water. Water can be economically and easily provided. The coolant connection device can be arranged in the region of the charging connection device. In particular, the coolant connection device can be located, for example, under the same charging flap provided for the charging connection device. It is also conceivable that the coolant connection device and the charging connection device are integrated into a combined connection. For example, a combined charging plug can be provided accordingly, which has both electrical contacts for electrical coupling to the charging connection device and connections for coupling to the coolant connection device. However, it is also conceivable for the charging plug to be formed separately from one or more coolant conduits, which can be correspondingly coupled to the coolant connection device. As explained in more detail below, the coolant connection device preferably comprises two connections, in particular one for the coolant inlet and one for the coolant outlet. A coolant connection on the charging column side can accordingly also have two lines, one through which the coolant can be supplied to the vehicle and one through which the coolant is fed back out of the vehicle. In addition, it is also conceivable that the coolant connection device can be coupled to another external coolant source, that is, the external coolant source does not necessarily have to be provided by the external energy source itself. It is also conceivable that the coolant connection device is designed in such a way that it can be coupled to a conventional garden hose or to a hose or the like that can be coupled to a city water connection. This advantageously means that the cooling and extinguishing option provided by the energy storage flooding device is not only limited to use at charging columns or charging stations that have such an external coolant source. For example, both the cooling in the first operating mode and the flooding of the energy storage in the second operating mode can be applied at home when charging the vehicle at a household socket or a wall box with simultaneous connection to a water hose. It is also conceivable to provide an option for flooding the energy storage independently of a charging process being carried out. In other words, the energy storage can also be flooded if an external coolant source is connected to the coolant connection device, regardless of whether a charging process is currently being carried out, and in particular also regardless of whether the charging connection device is currently being coupled to an external electrical energy source or not.

In the context of the present invention, the term “external” refers to the motor vehicle. “External” should therefore be interpreted as meaning external to the motor vehicle, namely outside the motor vehicle and in particular not belonging to the motor vehicle.

The first and second operating conditions relate to the energy storage. The second operating condition defines a critical state of the energy storage according to at least one predetermined criterion. This can be detected by a detection device of the motor vehicle. This second operating condition can be present, for example, if a thermal runaway of a battery cell of the energy storage or an imminent or incipient thermal runaway of the battery cell or a gas leak from the battery cell or a fire in the energy storage is detected. The second operating condition can be detected, for example, by detecting a temperature of the energy storage that is greater than a predetermined threshold value. Other detection options are also conceivable. In the first operating condition, the energy storage is charged and is not in a critical condition. The energy storage can also be in other conditions, for example in one or more other normal operating modes, in which the energy storage is neither being charged nor in a critical state.

The cooling device can be designed, for example, as a cooling plate which has cooling ducts through which a coolant can flow. The cooling device, in particular the cooling plate, can at the same time also be part of a storage housing of the energy storage, for example in the form of a cover and/or a base of said housing. In this case, the cooling device is designed, so to speak, as a cooling base and/or cooling cover of the battery housing of the energy storage Although the present discussion refers to a cooling device and a coolant, the cooling device and the coolant can also be similarly used in order to heat the energy storage. The specific examples described below in connection with the cooling of the energy storage also apply analogously to heating of the energy storage. For the purpose of flooding the energy storage, the supplied coolant, which is used to flood the energy storage, should preferably be as cold as possible. Nevertheless, an extinguishing effect can also be achieved with a warm coolant. The coolant is therefore preferably a liquid coolant. The fact that the energy storage is thermally coupled to the cooling device can be understood to mean that the cooling device is as close as possible to the energy storage or even, as is preferred, is part of the energy storage, namely part of the storage housing of the energy storage. Therefore, the cooling device is also directly adjacent to the interior of the energy storage, in particular to the interior space delimited by the storage housing. In normal operation, a vehicle-internal coolant flows through the cooling device, as a result of which the cells of the energy storage are cooled without them being in direct contact with the coolant. For this purpose, the motor vehicle has a coolant reservoir for accommodating the coolant inside the vehicle, and is designed to thermally regulate the energy storage by means of the cooling device and the coolant from the coolant reservoir, when the motor vehicle is not coupled to the external coolant source, and in the event that a coolant is contained in the coolant reservoir. In other words, this coolant reservoir inside the motor vehicle can also be used to cool the energy storage, regardless of whether an external coolant source is currently connected to the motor vehicle or not. Conversely, as already described above, this existing cooling structure can also be used to provide additional cooling external to the motor vehicle and, above all, to provide an extinguishing means in the second operating condition of the energy storage.

If a specific emergency situation occurs, such as a defect in the energy storage, an overheating of the energy storage, a thermal runaway of a battery cell in the energy storage or the like, coolant enters directly into the interior of the energy storage. As a result, the coolant also comes into direct contact with the battery cells located in the interior of the energy storage device. As a result, the energy storage is cooled and extinguished in a particularly efficient manner in the event of a thermal runaway. The thermal runaway, in particular a thermal propagation across all battery cells, can thus advantageously be prevented or at least greatly delayed. A battery fire can also be possibly prevented.

The coolant connection device has, for example, a coolant supply connection via which coolant from the external coolant source can be supplied to the motor vehicle, and a coolant discharge connection via which the coolant supplied to the motor vehicle can be discharged from the motor vehicle in the first operating condition. In the second operating condition, the coolant does not necessarily have to be discharged from the motor vehicle via the coolant connection device. On the contrary, in this case it is preferred that the energy storage has a storage housing which delimits the interior of the energy storage from an environment, wherein at least one drain device is arranged in the storage housing, via which the coolant flowing into the interior can be discharged from the interior of the energy storage, wherein the drain device opens into the environment and is not fluidically connected to the coolant connection device. A particularly efficient flooding of the energy storage can thereby be implemented.

There are several options for supplying the coolant to the interior of the energy storage in the second operating condition, which are explained in more detail below. One of these options consists in opening at least one first flooding opening providing a fluid connection between the cooling device and the interior of the energy storage. The coolant can thus reach the interior of the energy storage directly via the conventional cooling device. These first flooding openings can be designed to be controllable or, for example, they can also be formed as predetermined breaking points, for example.

The at least one first flooding opening, and in particular also the at least one second flooding opening described below, can be designed in such a way that they can be opened by means of a pyrotechnic device and/or by activation by means of a control device and/or by breakdown above a predetermined coolant pressure and/or by breakdown above a predetermined temperature. The at least one second flooding opening mentioned can be arranged in the heat exchanger itself. In this way, in the second operating condition, the first and the second cooling circuit part are fluidically coupled, so that in the second operating condition, coolant supplied to the first circuit part via the coolant supply connection can flow via the heat exchanger and the at least one second flooding opening into the second circuit part and can be introduced, via the cooling device and the at least one first flooding opening, into the interior of the energy storage.

However, this integration of a second releasable flooding opening in a heat exchanger is relatively complicated or requires a corresponding modification of such a heat exchanger, which in turn is associated with additional costs. Therefore a particularly advantageous embodiment of the invention provides that the motor vehicle has a valve device which has at least a first position and a second position, wherein in the first operating condition a fluid connection between the first cooling circuit part and the interior of the energy storage is blocked by the valve device positioned in the first position and wherein in the second operating condition the fluid connection between the first cooling circuit part and the interior of the energy storage is released by the switching device positioned in the second position, in particular wherein the motor vehicle is designed such that when the valve device is in the second position a fluid connection between the coolant connection device and the heat exchanger is blocked.

Advantageously, the flow of coolant supplied externally to the motor vehicle can be directed in a targeted manner by means of the valve device, depending on the operating condition. In the first operating condition, the coolant supplied to the motor vehicle is only conducted through the heat exchanger and discharged from the motor vehicle, while in the second operating condition the externally supplied coolant is introduced into the energy storage. The valve device is preferably arranged outside of the heat exchanger. A standard heat exchanger can thus be used as the heat exchanger in order to thermally couple the first cooling circuit part to the second cooling circuit part in the normal operating condition, for example in the first operating condition.

It is particularly advantageous if the valve device in the second position blocks the fluid connection from the coolant connection device to the heat exchanger or from the heat exchanger to the coolant connection device. This has the advantage that all of the coolant supplied to the motor vehicle can be used to flood the energy storage and does not flow through the heat exchanger unnecessarily. The valve device can be designed, for example, as a 3-2-way valve or as an individual valve or as a combination of individual valves and so on. Furthermore, the valve device can be arranged at any point of the first cooling circuit part, downstream, for example before the heat exchanger, but an arrangement downstream of the heat exchanger is also possible.

In the second operating condition, in which the valve device is in the second position, a fluid connection between the coolant connection device and the heat exchanger does not necessarily have to be blocked in such a way that no coolant can get into the heat exchanger, but at least in such a way that no coolant supplied to the coolant connection device can reach the discharge connection.

There are again various possibilities for activating the valve device, namely for transferring the valve device from the first position to the second position and/or vice versa. Basically, it is preferred that the valve device is designed to be controllable. For example, the valve can be activated by a control device of the motor vehicle, for example by a control device which is associated to the battery management system. If the control device detects a defect in the energy storage, thermal runaway of a battery cell, a short circuit or the like, the control device can activate the valve device accordingly in order to flood the energy storage. In this case, the valve or, in general, the valve device is activated inside the vehicle, that is to say the vehicle recognizes that the temperature sensors of the high-voltage battery or, in general, of the energy storage unit suggest a thermal runaway. In this case, the vehicle can correspondingly open the valve device, namely transfer it from the first position to the second position. According to a further embodiment, the valve device can also be controlled from outside the vehicle, that is to say by remote control, for example by the charging station or in general by the electrical energy source external to the vehicle, or by the fire brigade, or the like. Even if there is a defect in the vehicle's control unit, it is still possible to control the valve. Furthermore, the valve device can, for example, be of bistable design, namely the valve position last assumed is maintained independently of the energization until a further control signal arrives. If the valve device is, for example, transferred from the first to the second position, the valve device remains in the second position, even independently of further energization. The valve device can only be transferred from the second position to the first position again by a new control signal. The valve device then remains in the first position until another control signal is provided. It is also conceivable to design the valve device in such a way that it has to be kept in the first position during the charging process by means of active energization. If this energization or, in general, the control signal fails, the valve device is automatically transferred to the second position, for example via a spring, magnetic interaction or the like. If, for example, there is a system failure in the motor vehicle and in particular in the control of the valve device, the energy storage is automatically flooded.

The fluid connection from the valve device to the energy storage can take on different forms. According to an advantageous embodiment, the fluid connection between the first cooling circuit part and the interior of the energy storage is provided by means of a fluid conduit leading from the valve device to the energy storage, which opens into the interior of the energy storage and which is not part of the second cooling circuit part. In other words, this fluid conduit can form a direct connection between the valve device and the interior of the energy storage without any components connected in between. A particularly efficient flooding of the energy storage can be achieved as a result. In this way, no special design of all the other components, in particular those of the second part of the cooling circuit, is required either. In addition, the fluid connection can be optimized in terms of its cross section or its other properties with regard to the flooding of the energy storage. In principle, the fluid connection can be provided by any conduit, which can comprise, for example, a tube and/or a hose and/or a duct with any geometry. Cavities between components can also be used as a fluid connection. A branched design of the guide ducts for guiding the coolant is also conceivable. Since the fluid connection is not part of the second cooling circuit, in a state that is different from the second operating condition, in particular the first operating condition, the vehicle's internal coolant, which flows through the second cooling circuit to control the temperature of the energy storage, does not flow through the fluid connection. In principle, this fluid connection is only used in the second operating condition for the purpose of flooding the energy storage.

According to a further advantageous embodiment of the invention, the fluid connection between the first cooling circuit part and the interior of the energy storage comprises a first fluid conduit leading from the valve device to the second cooling circuit part. In other words, in this example the fluid connection extends through the second part of the cooling circuit. The valve device is therefore indirectly fluidically coupled to the interior of the energy storage via the second cooling circuit part. This has the great advantage that additional cooling of the externally supplied coolant can be provided easily, as will be explained in more detail later. This is because an already existing connection of the coolant circuit, in particular of the second cooling circuit part, to a coolant circuit can be used for this purpose.

According to a further advantageous embodiment of the invention, the fluid connection between the first cooling circuit part and the interior of the energy storage comprises a second fluid conduit connecting the first fluid conduit with the cooling device. This second fluid conduit is also part of the second part of the cooling circuit. This second fluid conduit is therefore also used in normal operation to control the temperature of the energy storage by means of the cooling device. In order to flood the energy storage via the cooling device, the cooling device can have one or more releasable flooding openings which, for example, as already described above for the first flooding openings, can be formed by predetermined breaking points and can open as a result of increased fluid pressure and thus open the fluid connection between the cooling device, in particular the interior of the cooling ducts provided by the cooling device and the interior of the energy storage. However, the releasable flooding openings can also be designed, for example, as adjustable valves. In particular, these can be formed by switchable connection points from the battery cooling system to the degassing duct, namely as connection points between the cooling device and a degassing duct, via which venting gases escaping from battery cells can be discharged in the event of thermal runaway. Such a degassing duct is accordingly located within the battery housing, which is generally referred to as the storage housing, and is in direct contact with corresponding releasable degassing openings of the battery cells. In this way, the coolant can very easily be brought into direct contact with the battery cells in the second operating condition.

It is also particularly advantageous if the motor vehicle has a refrigerant circuit for cooling the second part of the cooling circuit, wherein the refrigerant circuit is thermally coupled to at least one portion of the second fluid conduit in such a way that the coolant introduced from the first part of the cooling circuit via the valve device into the second part of the cooling circuit in the second operating condition and flowing through the second fluid conduit can be cooled by means of the coolant circuit before being introduced into the interior of the energy storage. In particular when an external coolant is used to flood the energy storage, as in this case, it can happen, especially in summer or with high outside temperatures, that this coolant supplied to the motor vehicle has a relatively high temperature, for example 20° C. However, lower temperatures of such a coolant are much more efficient in counteracting a thermal runaway of the energy storage and, in particular, also a battery fire. This can advantageously be achieved by the embodiment described, according to which the refrigerant circuit of the motor vehicle can now be used to cool the externally supplied coolant. A refrigerant circuit is usually already provided in the motor vehicle, which circuit can be used to cool the second circuit part in normal operating conditions, namely also in the first and second different operating conditions of the energy storage. If the coolant is now supplied to the second cooling circuit part via the valve device and the described fluid connection precisely for the purpose of flooding the energy storage, so that this externally supplied coolant also flows through the thermal coupling point between the second cooling circuit part and the refrigerant circuit, this externally supplied coolant can now advantageously be additionally cooled before being introduced into the interior of the energy storage. This significantly increases the cooling and extinguishing effect. The thermal coupling point between the refrigerant circuit and the second part of the cooling circuit can be provided via a heat exchanger, in particular a chiller.

According to a further very advantageous embodiment of the invention, at least in the event that in the second operating condition an energy supply for operating the refrigerant circuit cannot be provided by the energy storage, and in the event that the external energy source is connected to the charging connection device, the energy supply for operating the refrigerant circuit can be provided by energy that can be drawn from the external energy source and independently of the energy storage. Thus, when the motor vehicle is currently coupled to the charging station or another external energy source, the power supply for the refrigerant circuit can advantageously be provided directly via this external energy supply. Even in the event of a defect in the energy storage, the cooling function can still be maintained via the refrigerant circuit. The energy supply to the refrigerant circuit, in particular its electrical components, for example an electric air conditioning compressor, can then be provided accordingly, for example by the charger of the motor vehicle, which draws the energy from the external energy source. However, if the motor vehicle is not currently connected to the external energy source, it can be provided that the energy storage is designed in such a way that battery cells or cell modules that are still intact and which are not yet affected by a thermal runaway, for example, can be used to supply energy to the refrigerant circuit.

According to a further advantageous embodiment of the invention, the motor vehicle is arranged in such a way that, in the second operating condition, a pre-compressed refrigerant, in particular $CO_2$, is introduced from the refrigerant circuit into the interior of the energy storage with expansion, in particular wherein the interior of the energy storage comprises at least two hermetically sealed partial spaces, in each of which at least one storage cell of the energy storage is arranged, wherein the motor vehicle is designed to selectively introduce the refrigerant into the respective partial spaces. If, for example, $CO_2$ is used as the refrigerant in the refrigerant circuit, this refrigerant can advantageously also be used in the second operating condition to support cooling of the energy storage and/or to extinguish a fire in the energy storage. For this purpose, the refrigerant can also be introduced into the interior of the energy storage, as described. For this purpose, a corresponding fluid connection to the energy storage, in particular in the form of a conduit, can be provided, which connects, for example, the refrigerant circuit and/or a separate refrigerant reservoir with the energy storage, as will be explained in more detail later. Above all, it is particularly advantageous that the refrigerant present in pre-compressed form, which can in particular be in liquid state, is expanded when it is introduced into the energy storage. In the simplest case, this expansion can be achieved simply by introducing it into the interior of the energy storage, as a result of which the refrigerant can spread into a larger volume and thereby expand. The introduction into the energy storage can in turn be controllable by a valve which is positioned at any point in the fluid connection or in the refrigerant conduit leading to the energy storage. Releasing the fluid connection by opening this valve simultaneously causes the refrigerant to expand, which is why such a valve can also be referred to as an expansion valve. Due to the expansion of the gas, an extreme cooling of the gas, especially $CO_2$, can be achieved. Cooling down to −100° C. or less is conceivable. This means that particularly efficient cooling and fire extinguishing action can be provided in case of emergency.

It is also very advantageous if the energy storage is separated into a plurality of partial spaces which are hermetically sealed from one another. In this way, the gas introduced into a partial space as a refrigerant cannot escape from this partial space. The possibility of selectively introducing the refrigerant into the respective partial spaces then makes it possible, for example, to introduce the refrigerant in a targeted manner into the affected partial space. The affected partial space is the one that includes a battery cell that is thermally running away or for which an elevated temperature above a threshold value was detected or that meets another criterion that makes it necessary to flood the corresponding partial space. Even if little refrigerant is available in the motor vehicle, the effect of this refrigerant can be maximized by introducing it only into the affected partial spaces. However, it is also conceivable for the refrigerant to be introduced into all partial spaces, even if only a few or one partial space are affected. This has the advantage that by separating into partial spaces, improved thermal decoupling can be achieved among these partial spaces. The refrigerant introduced into the affected partial space heats up very strongly, for example due to the thermal runaway battery cell located in this partial space. However, due to the hermetic sealing of the partial space, this heating does not spread so quickly to neighboring partial spaces. This also makes it possible to prevent or at least delay a thermal runaway of further cells that are located in further partial spaces.

According to a further advantageous embodiment of the invention, the motor vehicle is designed to supply a refrigerant, which is provided in a refrigerant reservoir, which is provided as a refrigerant reservoir external to the vehicle or an additional reservoir internal to the vehicle, at least in the second operating condition, to the coolant circuit and/or directly to the interior of the energy storage, namely not passing through the refrigerant circuit or components included therein. Such a coolant reservoir can be provided, for example, as a compressed gas container, preferably with $CO_2$. Such a compressed gas container can generally be provided both outside the vehicle, for example by the charging station, and inside the vehicle. In the latter case, this coolant reservoir should be understood as an additional reservoir. This means that this additional reservoir can be provided in addition to one or more refrigerant reservoirs of the refrigerant circuit. The refrigerant contained in this additional reservoir is therefore normally not used to operate the refrigerant circuit. The possible uses of the refrigerant accommodated in this additional reservoir can be limited compared to the possible uses of a refrigerant contained in a further coolant reservoir of the coolant circuit. The refrigerant contained in this additional reservoir can then be used, for example, in the second operating condition, as described, in order to be introduced into the interior of the energy storage, in particular again optionally selectively into respective partial spaces of the energy storage device. However, such an additional reservoir can advantageously also be used for other purposes: for example, for compensating a leak from the refrigerant circuit. In other words, if required, refrigerant from the additional reservoir can also be supplied to the refrigerant circuit if the quantity of refrigerant in the refrigerant circuit has decreased by a predetermined value or has fallen below a specific limit value. In addition, carbonated drinking water could also be made available to the user of the motor vehicle according to the soda stream principle. Thus, numerous positive secondary effects can be achieved by such an additional refrigerant reservoir.

In the second operating condition, the refrigerant contained in this refrigerant reservoir, in particular CO2, can be supplied to the interior of the energy storage under expansion. For this purpose, the CO2 or, in general, the refrigerant can either be introduced directly into the interior of the energy storage device via a conduit or it can first be fed to the refrigerant circuit and, as described, reach the interior of the energy storage device through the same. Also in this case the supply is accompanied by an expansion of the refrigerant, so that the cooling effect is particularly efficient.

According to a further advantageous embodiment of the invention, the motor vehicle has a central connection which is different from the coolant connection device and which is fluidically connected to the first and/or second cooling circuit at least in the second operating condition and via which a coolant for flooding the interior of the energy storage can be supplied to the motor vehicle in the second operating condition. This is very advantageous since such a central connection can be used on one hand to provide a different type of connection or coupling option than, for example, through the coolant connection device. For example, the central connection can be provided with a connection that can be coupled to a typical, standardized fire hose connection, such as a C-hose or D-hose. A coolant can thus advantageously also be supplied externally, in particular by a fire brigade, independently of the presence of a charging station or the current execution of a charging process in the motor vehicle. This central connection is only provided for emergency situations, namely in case of the second operating condition, and remains unused in other normal operating conditions. The additional central connection can further increase security.

Furthermore, the invention also relates to a method for operating a motor vehicle with an energy storage flooding device and with an energy storage that can be charged using an external electrical energy source, with a charging connection device for electrically connecting the energy storage to the external electrical energy source, and with a coolant connection device for coupling with an external source of coolant provided by the external source of electrical energy. The motor vehicle is arranged in such a way that, at least in a specific first operating condition, a coolant can be supplied to the motor vehicle via the coolant connection device to control the temperature of the energy storage by means of the cooling device during a charging process for electrically charging the energy storage, wherein the energy storage flooding device is designed to flood an interior of the energy storage in at least one specific second operating condition different from the first operating condition. The motor vehicle has a first cooling circuit part and a second cooling circuit part, which is fluidically separated from the first cooling circuit part at least in the first operating condition, and a heat exchanger, which thermally couples the first cooling circuit part and the second cooling circuit part, wherein the cooling device is part of the second cooling circuit part and wherein the energy storage is flooded in the second operating condition by means of the coolant supplied to the first cooling circuit part via the coolant connection device.

The invention also includes developments of the method according to the invention, which comprise features which are described in the context of the developments of the motor vehicle according to the invention. For this reason, the corresponding developments of the method according to the invention are not described again in this case.

The motor vehicle according to the invention is preferably designed as an automobile, in particular as a passenger car or truck, or as a passenger bus or motorcycle.

The invention also comprises the combinations of the features of the described embodiments. The invention thus also includes implementations that respectively comprise a combination of the features of several of the described embodiments, unless the embodiments were described as mutually exclusive.

BRIEF DESCRIPTION OF THE FIGURES

Exemplary embodiments of the invention are described hereinafter. In the figures.

DETAILED DESCRIPTION

Figure 1:
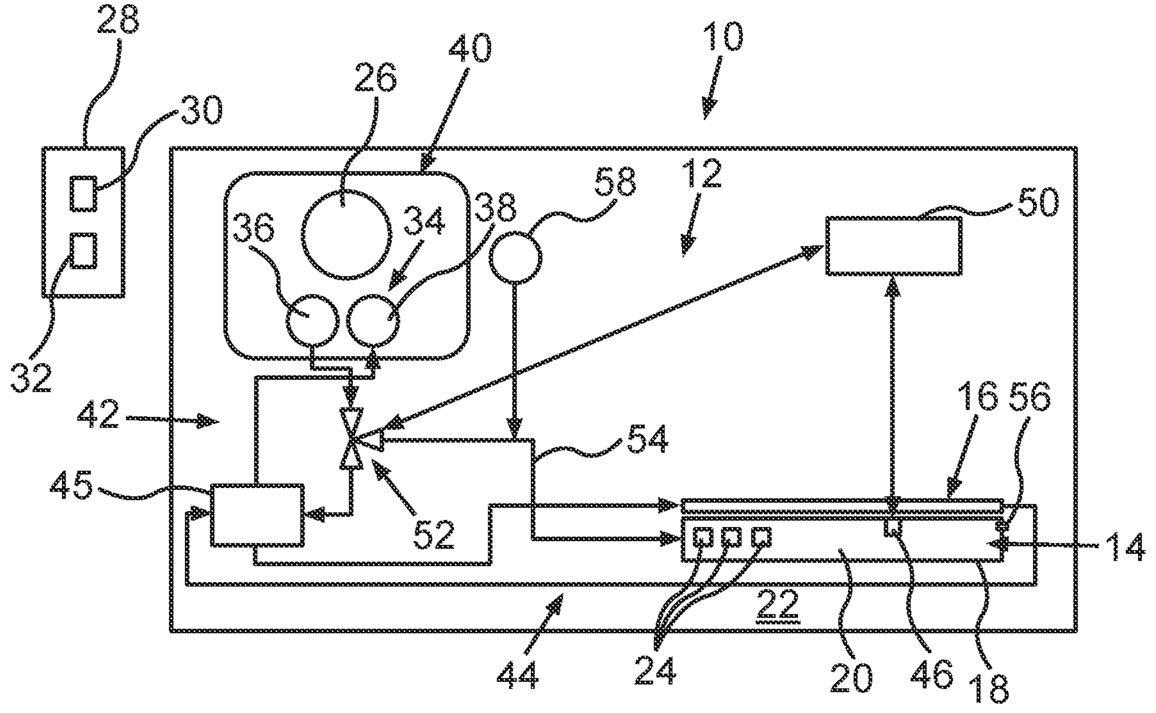
FIG. 1 shows a schematic representation of a motor vehicle with an energy storage flooding device according to a first exemplary embodiment of the invention.

The exemplary embodiments explained hereinafter are preferred embodiments of the invention. In the exemplary embodiments, the described components of the embodiments each represent individual features of the invention to be considered independently of one another, which each also develop the invention independently of one another. Therefore, the disclosure is also intended to comprise combinations of the features of the embodiments other than those represented. Furthermore, the described embodiments can also be supplemented by further ones of the above-described features of the invention.

In the figures, same reference numerals respectively designate elements that have the same function.

FIG. 1 shows a schematic representation of a motor vehicle 10 with an energy storage flooding device 12 according to a first exemplary embodiment of the invention. Motor vehicle 10 has an energy storage 14 in the form of a high-voltage battery, and a cooling device 16 for cooling high-voltage battery 14. In particular, cooling device 16 can also be regarded as part of energy storage device 14, in particular as part of a storage housing 18, which encloses an interior space 20 of the high-voltage battery 14 and thus separates it from an environment 22. In addition, one or more battery cells 24 of the high-voltage battery 14 can be accommodated in the interior 20, only a few of which are shown in this example for reasons of clarity. Moreover, the battery cells 24 can be formed, for example, as lithium-ion cells and can also be grouped to form battery modules. Furthermore, the motor vehicle 10 has a charging connection device 26 for electrically charging the energy storage 14, which device can be coupled, for example via a charging plug, to an energy source external to the motor vehicle, such as a charging column 28 in this example. This charging column 28 can comprise a control device 30, which can also be referred to as the central processing unit of the charging column 28, as well as a coolant source 32, for example a water connection. As a result, it is advantageously possible to provide a cooling or temperature regulation function during a charging process by using the charging column 28. Correspondingly, the motor vehicle 10 has a coolant connection device 34 which in turn comprises a coolant supply connection 36 and a coolant discharge connection 38. The vehicle side is thus provided with a charging plug connection 26 and at least two cooling fluid connections 36, 38. The coolant connection device 34 and the charging connection device 26 can be arranged in a common connection region 40 of the motor vehicle 10, for example under a common charging flap. The charging plug for coupling to the charging connection 26 can also comprise the connections for coupling to the coolant connection device 34. Alternatively, separate conduits can also be provided, via which the coolant can be supplied from the external coolant source 32 to the coolant supply connection 36 and can be discharged from the motor vehicle 10 via the coolant discharge connection 38 and then returned to the charging station 28, for example. Thus, advantageously, for example during a charging process for charging the high-voltage battery 14, an external coolant can be supplied to the motor vehicle 10 and then discharged again, which coolant can be used during the charging process for thermal regulation, preferably for cooling, of energy storage 14.

It is now particularly advantageous if the externally supplied coolant is not used directly to cool the energy storage 14 via the cooling device 16, but only indirectly, so that the vehicle's internal coolant does not mix with the externally supplied coolant. The motor vehicle 10 therefore has a first cooling circuit part 42 and a second cooling circuit part 44, which are fluidically separated from one another at least in a first operating condition while charging the energy storage 14, and in every operating condition they are preferably fluidly separated from one another and are only thermally coupled to one another, namely for example via a heat exchanger 45. As a result, heat absorbed by the coolant flowing in the second cooling circuit part 44 can be transferred to the externally supplied coolant flowing in the first cooling circuit part 42. The cooling of the energy storage 14 during the charging process is thus even more efficient, since the cooling is additionally supported by the externally supplied coolant. In particular, in-vehicle cooling measures, such as the activation of a cooling fan, can be reduced or completely deactivated. There are therefore at least two cooling circuits in the vehicle 10 which are referred to here as the first cooling circuit part 42 and the second cooling circuit part 44. The second cooling circuit part 44 represents the conventional battery cooling. The first cooling circuit part 42 represents an additional cooling circuit, which is fed and cooled by the fluid connection of the charging station. Heat transfer takes place via said heat exchanger 45, which thermally connects the two cooling circuits, namely the first cooling circuit part 42 and the second cooling circuit part 44.

In particular, advantageously, this not only provides efficient cooling of the energy storage 14 during the charging process, but also the possibility of flooding in the event of a defect in the energy storage 14, in particular in the event of a thermal runaway of at least one of the battery cells 24. In order to detect such a thermal runaway, the energy storage 14 can comprise one or more sensors 46, such as a temperature sensor 46 of this example. The sensor signal can be detected by a control device 50 of the motor vehicle 10, for example a central processing unit in the vehicle 10, which can be a battery management system of the energy storage 14, for example. If the control device 50 detects a thermal runaway of one of the battery cells 24 or another corresponding defect in the energy storage 14, the control device 50 as part of the flooding device 12 can trigger the flooding of the energy storage 14. In this case, the interior can be filled with coolant.

There are several options for flooding the energy storage 14. For example, the cooling device 16 can be provided with releasable flooding openings, which are not explicitly shown here, and which can be designed as predetermined breaking points, for example. In the event of a thermal runaway of the energy storage 14, opening of these releasable flooding openings of the cooling device 16 can be initiated, for example by increasing the coolant pressure. The heat exchanger 45 can be provided with a corresponding releasable flooding opening, which can also be designed as a predetermined breaking point. An increase in the pressure of the coolant on the inlet side, for example by the charging column 28 itself, can correspondingly release the flooding opening in the heat exchanger 45 and correspondingly also in the cooling device 16, so that the interior 20 of the energy storage 14 is flooded. However, this requires a special design of the heat exchanger 45 as well as of the cooling device 16 with corresponding releasable flooding openings, as well as the implementation of a possible targeted increase in pressure in the second and/or first circuit part 44, 42. It is therefore particularly advantageous, as is shown in FIG. 1 if a valve device 52 is arranged in the first cooling circuit part 42, which is also referred to simply as a valve 52 in the following. This valve can be designed to be controllable by the control device 50, for example. Optionally, a remotely controlled valve device 52 is also conceivable, whereby the valve can also be controlled by a vehicle-external control device, such as by the fire brigade. The valve device 52 comprises at least two positions. For example, the valve device 52 can be designed as a 3-2-way valve or as an individual valve, and the like. In a normal operating condition, namely in which no defect in energy storage 14 or at least no thermal runaway of a battery cell 24 of energy storage 14 is present, valve device 52 assumes the first position, according to which a fluid connection between coolant connection device 34 and energy storage 14 is blocked. In contrast, a fluid connection between the coolant supply connection 36 and the coolant discharge connection 38 through the heat exchanger 45 is enabled in the first position of the valve device 52, so that in the first operating condition the externally supplied coolant can flow through the valve device 52, as well as through the heat exchanger 45 and can then be discharged from the vehicle 10. In case of a thermal event, which can be detected by the control device 50, then the valve device 52 is actuated, for example, or the valve device 52 is otherwise transferred to its second position. In this second position, the valve device 52 establishes a fluid connection between the coolant connection device 34, in particular the coolant supply connection 36, and the energy storage 14, in particular the interior space 20 of the energy storage 14. The valve 52 is therefore designed to open a cooling fluid branch from the first cooling circuit part 42 directly into the high-voltage battery 14. This means that the cooling fluid, which is also referred to as coolant, is fed from the charging column 28 directly into the high-voltage battery 14, floods the battery and is discharged through the drain device 56, which can optionally also be implemented by existing pressure relief valves or via newly applied water outlets. In this case, the fluid connection between the coolant supply connection 36 and the coolant discharge connection 38 is preferably blocked. In this example, the valve device 52 is connected downstream of the heat exchanger 45. However, an arrangement downstream of the heat exchanger 45 would also be conceivable. In principle, the valve 52 can be positioned in any position in the first cooling circuit part 42. Furthermore, in this example a coolant conduit 54 is provided from the valve device 52 to the energy storage 14, which conduit opens into the interior 20 of the energy storage 14. The conduit 54 leads directly from the valve device into the interior 20 of the energy storage, and does not pass through components of the cooling device 16 or other components of the second cooling circuit part 44. This can provide direct flooding of the energy storage 14 in the second operating condition. The coolant externally supplied to the coolant supply connection 36 can thus be introduced directly and almost completely into the energy storage 14. The energy storage 14 is flooded as a result. In one embodiment variant, the valve 52 is activated inside the vehicle, namely the vehicle recognizes that the temperature sensors 46 of the high-voltage battery 14 indicate a thermal runaway. In this case, the vehicle 10 can open the valve 52, namely transfer it to the second position described here. In a further embodiment, the valve can also be controlled outside of the vehicle, for example via the charging column 28, a fire brigade, and so forth. In addition, the valve 52 can optionally also be bistable, that is to say the last valve position assumed by the valve is maintained independently of the energization until the arrival of a further control signal.

In addition, the energy storage 14 can also have a releasable drain device 56, as already mentioned, via which the coolant can be discharged again and can be supplied to the environment 22 after the energy storage 14 has been flooded. This drain device 56 thus enables the coolant to exit directly from the energy storage device 14 and into the environment 22. The exiting coolant is therefore not discharged via the coolant connection device 34. The discharge device 56 can be designed, for example, as a pressure relief valve or the like. In addition, the drain device 56 can be arranged in an upper region of the storage housing 18, for example. It is thus advantageously possible for the storage housing 18 to be filled at least partially or almost completely with coolant before it is discharged again via the drain device 56. As a result, the cooling of the energy storage 14 is particularly efficient.

According to a further embodiment, a separate central connection 58 can be provided for extinguishing a high-voltage battery 14. This connection can be combined with the branched conduit 54, which extends from the valve device 52 to the energy storage 14, or be fluidly connected thereto. Thus, advantageously, the high-voltage battery 14 can also be extinguished away from a charging column 28, for example by the fire brigade. In addition, this central connection 58 can also be used if an error occurs when the valve 52 is switched. If, for example, the battery 14 is not properly flooded via the valve 52, the coolant supply conduit coming from the charging station 28 can alternatively also be connected to this central connection 58, or a separate fire hose can be coupled by the fire brigade to this central connection 58 in order to bypass the valve 52 and flood the battery 20 directly. The coolant supply connection 36 and/or the central connection 58 can be coupled not only to a coolant source 32 provided by the charging column 28, but also via another water connection, such as by means of a garden hose or the like, or a generic city water connection.

Figure 2:
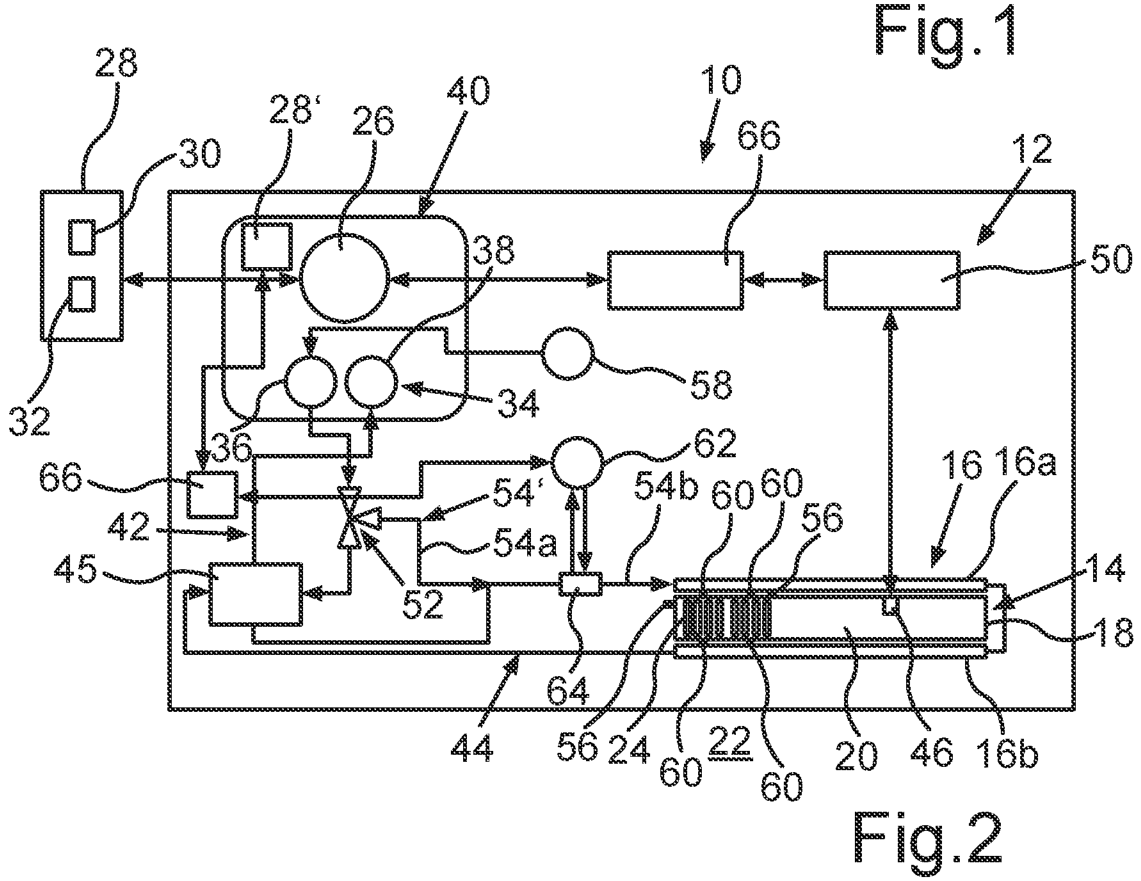
FIG. 2 shows a schematic representation of a motor vehicle with an energy storage flooding device according to a second exemplary embodiment of the invention.

FIG. 2 shows a schematic representation of a motor vehicle 10 with a flooding device 12 according to a further exemplary embodiment of the invention. The motor vehicle 10, and in particular also the charging column 28, can be designed as described before, with the exception of the differences described below. If a high-voltage battery fire occurs while the vehicle is being charged, as described with reference to FIG. 1, the high-voltage battery 14 can be extinguished with water, which is provided by the charging column 28 and is supplied to the battery 14 via a valve switching of valve 52. However, in the variant described in relation to FIG. 1, the cooling capacity depends on the inlet temperature of the water provided by the charging column 28 or the city water connection. The inlet temperature of the water can be around 20° C. in summer, for example. As a result, the cooling capacity is relatively low.

In this example, the conduit 54' does not lead directly from the valve device 52 to the energy storage 14, as described in FIG. 1, but comprises a first conduit portion 54*a*, which opens into the second cooling circuit part 44. A second conduit portion 54*b* leads to the energy storage 14, in particular to the cooling device 16. This second conduit portion 54*b* is correspondingly part of the second cooling circuit part 44. The cooling device 16 also has releasable flooding openings 60. These can be designed as predetermined breaking points or preferably as controllable valves. Furthermore, the cooling device 16 in this example comprises a cover cooling system 16*a* and a base cooling system 16*b*. Both can be designed as cooling plates with cooling flow ducts. The releasable flooding openings 60 can also represent switchable connection points from the battery cooling system 16 to a degassing duct, to which the respective releasable degassing openings of the battery cells 24 are connected. This means that already existing structures of the cooling device 16 can be used. A modification of the cooling device 16 itself is therefore only marginally necessary.

The great advantage of this configuration is that the externally supplied coolant is supplied to the second cooling circuit part 44 before it is introduced into the interior 20 of the battery 14. This advantageously provides for additional cooling of the coolant before it is introduced into the interior 20, in particular via a coolant circuit 62 of the motor vehicle 10. This coolant circuit preferably uses CO2 as the coolant. The thermal coupling to the second cooling circuit part 44 can take place via a chiller 64, for example. The coolant flowing through the second cooling circuit part 44 is cooled by means of this chiller 64, at least during normal operation. In the second operating condition, after a thermal runaway was detected, the externally supplied coolant, after being introduced into the second cooling circuit part 44, is also passed through this chiller 64 before it is fed to the cooling device 16 and via the releasable openings to the interior 20 of the energy storage 14. In order to increase the cooling performance, active cooling of the externally supplied extinguishing medium can be provided via the vehicle-internal coolant circuit 62, which uses R744 or CO2 as a coolant, for example. For this purpose, the high-voltage components of the refrigerant circuit 62, for example an electric air conditioning compressor, are actively operated. In normal operation, that is to say in the absence of a defect in the energy storage 14, the energy required for this purpose is usually provided by the high-voltage battery 14. In the event of a defect in the high-voltage battery, it is now possible to use a still functioning power supply from the vehicle 10 to operate the refrigerant circuit 62, for example by using still intact battery modules of the battery 14 or an auxiliary battery, or alternatively via an external power supply system. This can in turn be provided by the charging column 28, if it is coupled to the charging connection device 26 via a charging plug. However, a central power supply 28' that is different from the charging column 28 can also be used, such as a domestic power supply or the like. This supply can also be connected via the charging connection device 26 to the motor vehicle 10 and correspondingly to the charging device 66 of the motor vehicle 10, which is shown twice in this example for better illustration. On the one hand, in normal operating conditions, namely in the first operating condition, this charging device 66 takes over the charging of the energy storage 14 via the charging column 28 connected to the charging connection 26. In the second operating condition, the charging device 66 takes over the power supply of the refrigerant circuit 62 via the externally connected energy source 28, 28'. As a result, it is advantageously possible to also supply and operate the refrigerant circuit 62 with energy independently of the energy storage 14. The refrigeration circuit, that is, the refrigerant circuit 62, then actively cools via a heat exchanger, such as the chiller 64 described in this case, the battery cooling circuit, that is, the second cooling circuit part 44, in the region of the fluid inlet before the battery cooling 16. This means that in case of a detected thermal runaway in the high-voltage battery 14, in particular through detection by the described temperature sensors 46, an extinguishing process can be triggered, for example in the following sequence: First, the temperature sensors 46 again report, at cell temperatures above a certain limit value, for example above 120° C. up to 140° C., an unavoidable thermal runaway. The valve 62 described above is then opened via the central processing unit 50 of the vehicle 10, namely it is transferred to the second position, and the coolant flow from the external coolant source or extinguishing medium source 32 is directed in the direction of the battery cooling circuit, namely the second cooling circuit part 44. The introduced cooling or extinguishing medium is further cooled via the chiller 64, which is cooled by the refrigeration circuit 62, which accordingly increases the cooling capacity. The cooled extinguishing medium is then guided via switchable connection points 60 from the battery cooling system 16 into the high-voltage battery 14, namely into the storage housing 18 and correspondingly into the interior 20, where the cooling and extinguishing process ultimately takes place. An outlet for the extinguishing or cooling medium can be implemented via the overpressure valves, as part of said discharge device 56, which enables a constant flow of coolant.

As already described, the extinguishing medium does not necessarily have to be provided by the charging column 28, but can also be provided through the user's city water connection or alternatively a water connection from a fire brigade. The coupling option is not only provided by the coolant supply connection 36, but again via the separate central connection 68. Different coupling options or different structural designs of the respective coupling options can also be implemented in order to offer two alternative connection options.

Figure 3:
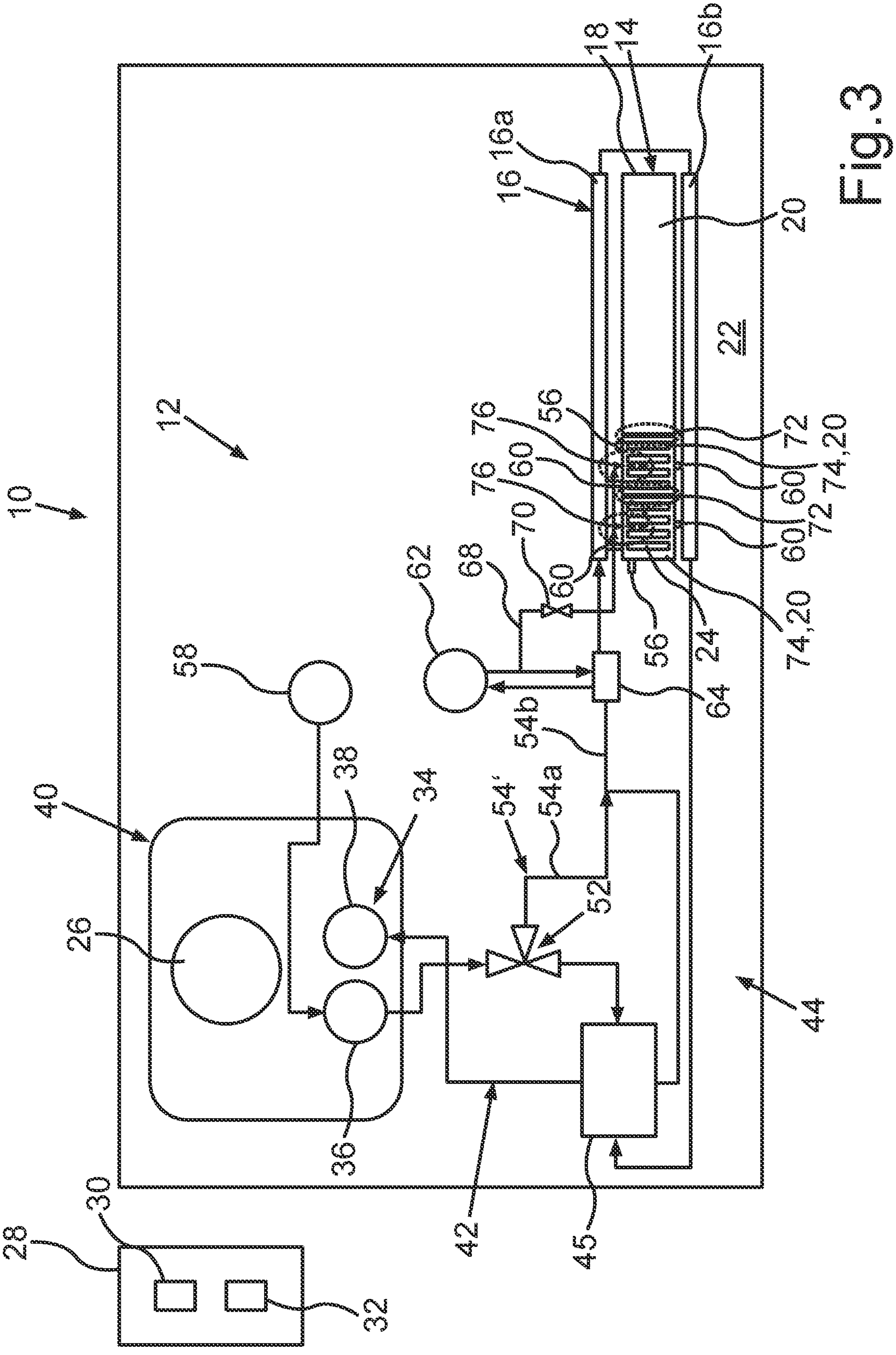
FIG. 3 shows a schematic representation of a motor vehicle with an energy storage flooding device according to a third exemplary embodiment of the invention.

FIG. 3 shows a schematic representation of a motor vehicle 10 with a flooding device 12 according to a further exemplary embodiment of the invention. Also in this case the motor vehicle 10 can be designed as described above, except for the differences described below. In this case, a branch, for example in the form of a conduit 68, is now additionally provided for guiding the refrigerant, for example CO2, from the refrigerant circuit 62 into the battery 14, in particular via expansion valves or at least one expansion valve 70. The refrigerant can thus be expanded from the refrigerant circuit 62 into the battery 14 through the at least one expansion valve 70. This provides expansion cooling, which leads to a further short-term, namely temporary, increase in the cooling capacity. According to a further embodiment variant, the refrigerant, for example CO2, which is normally only present in limited quantities in a motor vehicle 10, can be used more effectively for further cooling if gas-tight partition wall segments 72 are introduced inside battery 14, inside battery housing 18, which can separately be flooded with CO2. These partition wall segments 72 thus divide the interior 20 into individual chambers 74. At least one battery cell 24 is therefore arranged in each chamber. Furthermore, each separation chamber 74 can have a separate expansion valve 70 or at least a separate inlet 76. The inlet 76 can also be designed as a controllable valve. As a result, refrigerant can be selectively introduced into the relevant compartment, which is formed by the separating chambers 74. For example, it can be provided that only the separating chamber 74 is flooded in which the thermally runaway cell is located. Chambers 74 having only intact battery cells 24 do not necessarily have to be flooded, neither with CO2 nor with water. A corresponding discharge valve 56 can also be assigned to each separating chamber 74. The respective separating chambers 74 can also be flooded independently of the flooding by a coolant such as water. Accordingly, the motor vehicle 10 does not necessarily have to be coupled to an external coolant source 32 for this purpose.

Figure 4:
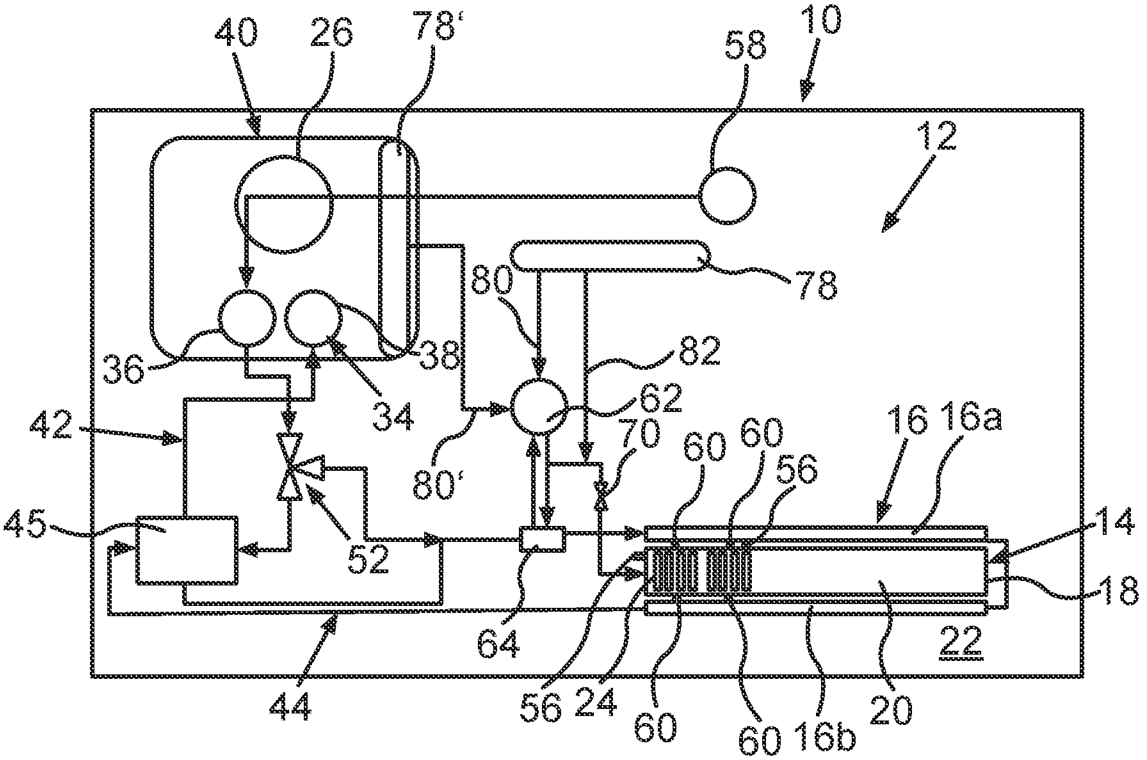
FIG. 4 shows a schematic representation of a motor vehicle with an energy storage flooding device according to a fourth exemplary embodiment of the invention.

FIG. 4 shows a schematic representation of a motor vehicle 10 according to a further exemplary embodiment of the invention. Also in this case the motor vehicle 10 can be designed as described above, except for the differences described below. In this example, a vehicle-internal CO2 cartridge 78 or, alternatively or additionally, a vehicle-external CO2 cartridge 78' is now additionally provided. As a result, the amount of CO2 introduced into the high-voltage battery 14 can be significantly increased. The CO2 cartridge 78, 78' can be connected to the coolant circuit 62 by a corresponding conduit 80, 80'. A positive secondary effect is that a leak from the refrigerant circuit 62 can be compensated. In addition, carbonated drinking water could also be made available to the user of the motor vehicle according to the soda stream principle. In normal operation, namely without leakage and in the absence of the detection of a thermal event or of a thermal runaway or of an incipient thermal runaway of a cell 24, the CO2 contained in this CO2 cartridge 78, 78' is not fed to the refrigerant circuit 62.

Alternatively, such a CO2 cartridge 78, 78', as illustrated in the case of the vehicle-internal cartridge 78, can also be introduced directly into the energy storage 14, in particular into the interior 20, via a conduit 82 bypassing the refrigerant circuit 62 and via the expansion valve 70. The possible introduction options are those previously described. The introduction is thus correspondingly independent of the functionality of the refrigerant circuit 62.

Overall, the examples demonstrate how the invention can provide high-voltage battery flooding via a vehicle-side charging station connection with valve solution and an increase in cooling capacity for extinguishing a high-voltage battery during charging or parking processes.

The invention claimed is:

1. A motor vehicle comprising:

an energy storage flooding device;

an energy storage configured to be charged by an external electrical energy source;

a charging connection device configured to electrically connect the energy storage to the external electrical energy source;

a coolant connection device configured to couple to an external coolant source; and a cooling device thermally coupled to the energy storage;

wherein the motor vehicle is configured at least in a specific first operating condition, to receive, via the coolant connection device, a coolant for thermally regulating the energy storage using the cooling device during a charging process for electrically charging the energy storage, wherein the energy storage flooding device is configured to flood an interior of the energy storage at least in a specific second operating condition different from the specific first operating condition;

wherein the motor vehicle further comprises a first cooling circuit part, a second cooling circuit part which is fluidically separated from the first cooling circuit part at least in the specific first operating condition, and a heat exchanger configured to thermally couple the first cooling circuit part and the second cooling circuit part, wherein the cooling device is part of the second cooling circuit part, wherein the motor vehicle further comprises a valve device arranged in the first cooling circuit part and having at least a first position and a second position, wherein, in the specific first operating condition, the valve device positioned in the first position blocks a fluid connection between the first cooling circuit part and the interior of the energy storage, wherein, in the specific second operating condition, the valve device positioned in the second position releases the fluid connection between the first cooling circuit part and the interior of the energy storage, wherein, when the valve device is positioned in the second position, the valve device blocks a fluid connection between the coolant connection device and the heat exchanger, wherein the fluid connection between the first cooling circuit part and the interior of the energy storage comprises a fluid conduit extending directly from the valve device to the interior of the energy storage without any components connected in between, and wherein the energy storage flooding device is configured to flood the interior of the energy storage in the specific second operating condition using the coolant supplied via the coolant connection device.

2. The motor vehicle according to claim 1, wherein the motor vehicle further comprises a refrigerant circuit, and wherein the motor vehicle is configured to introduce, in the specific second operating condition, a pre-compressed refrigerant from the refrigerant circuit with expansion into the interior of the energy storage, wherein the pre-compressed refrigerant comprises $CO_2$, wherein the interior of the energy storage comprises at least two hermetically sealed partial spaces, each of the at least two hermetically sealed partial spaces including at least one storage cell of the energy storage, and wherein the motor vehicle is configured to selectively introduce the pre-compressed refrigerant into respective ones of the at least two hermetically sealed partial spaces.

3. The motor vehicle according to claim 1, wherein the motor vehicle further comprises a refrigerant circuit, wherein the motor vehicle is configured, at least in the specific second operating condition, to supply a refrigerant from a refrigerant reservoir to the refrigerant circuit, directly to the interior of the energy storage, or both, and wherein the refrigerant reservoir is provided as a vehicle-external refrigerant reservoir or as an additional vehicle-internal refrigerant reservoir.

4. The motor vehicle according to claim 1, wherein the motor vehicle has a central connection that is different from the coolant connection device, wherein the central connection is fluidically connected to one or both of the first cooling circuit part and the second cooling circuit part, at least in the specific second operating condition, and wherein the central connection is configured to receive, in the specific second operating condition, the coolant for flooding the interior of the energy storage.

5. A motor vehicle comprising:

an energy storage flooding device;

an energy storage configured to be charged by an external electrical energy source;

a charging connection device configured to electrically connect the energy storage to the external electrical energy source;

a coolant connection device configured to couple to an external coolant source; and a cooling device thermally coupled to the energy storage;

wherein the motor vehicle is configured, at least in a specific first operating condition, to receive, via the coolant connection device, a coolant for thermally regulating the energy storage using the cooling device during a charging process for electrically charging the energy storage, wherein the energy storage flooding device is configured to flood an interior of the energy storage at least in a specific second operating condition different from the specific first operating condition;

wherein the motor vehicle further comprises a first cooling circuit part, a second cooling circuit part fluidically separated from the first cooling circuit part at least in the specific first operating condition, and a heat exchanger configured to thermally couple the first cooling circuit part and the second cooling circuit part, wherein the cooling device is part of the second cooling circuit part, wherein the motor vehicle further comprises a valve device arranged in the first cooling circuit part and having at least a first position and a second position, wherein, in the specific first operating condition, the valve device positioned in the first position blocks a fluid connection between the first cooling circuit part and the interior of the energy storage, wherein, in the specific second operating condition, the valve device positioned in the second position releases the fluid connection between the first cooling circuit part and the interior of the energy storage, wherein, when the valve device is positioned in the second position, the valve device blocks a fluid connection between the coolant connection device and the heat exchanger, wherein the fluid connection between the first cooling circuit part and the interior of the energy storage comprises a first fluid conduit leading from the valve device to the second cooling circuit part and a second fluid conduit connecting the first fluid conduit to the cooling device, wherein the motor vehicle has a refrigerant circuit for cooling the second cooling circuit part, and wherein the refrigerant circuit is thermally coupled to at least one portion of the second fluid conduit and is configured to cool the coolant that is introduced, in the specific second operating condition, from the first cooling circuit part via the valve device into the second cooling circuit part and flows through the second fluid conduit before the coolant is introduced into the interior of the energy storage.

6. The motor vehicle according to claim 5, wherein the motor vehicle is configured to introduce, in the specific second operating condition, a pre-compressed refrigerant from the refrigerant circuit with expansion into the interior of the energy storage, wherein the pre-compressed refrigerant comprises $CO_2$, wherein the interior of the energy storage comprises at least two hermetically sealed partial spaces, each of the at least two hermetically sealed partial spaces including at least one storage cell of the energy storage, and wherein the motor vehicle is configured to selectively introduce the pre-compressed refrigerant into respective ones of the at least two hermetically sealed partial spaces.

* * * * *